United States Patent [19]

Kasahara

[11] Patent Number: 5,592,459

[45] Date of Patent: Jan. 7, 1997

[54] OPTICAL HEAD DEVICE HAVING ELECTRO-MAGNETICALLY ROTATABLE AND STRAIGHT MOVABLE MEMBERS

[75] Inventor: Akihiro Kasahara, Chiba-ken, Japan

[73] Assignee: Kabushiki Kaisha Toshiba, Kawasaki, Japan

[21] Appl. No.: 364,288

[22] Filed: Dec. 27, 1994

[30] Foreign Application Priority Data

Dec. 27, 1993 [JP] Japan .................................. 5-332738

[51] Int. Cl.⁶ ........................................................ G11B 7/09
[52] U.S. Cl. ...................... 369/112; 369/44.14; 369/44.21
[58] Field of Search ............................. 369/44.14, 44.16, 369/44.15, 44.22, 112, 44.21

[56] References Cited

U.S. PATENT DOCUMENTS

| | | | |
|---|---|---|---|
| 5,062,095 | 10/1991 | Horikawa et al. | 369/44.22 |
| 5,105,405 | 4/1992 | Hashimoto et al. | 369/44.22 |
| 5,414,563 | 5/1995 | Tanaka | 369/44.15 |
| 5,442,490 | 8/1995 | Suzuki | 369/44.15 |

FOREIGN PATENT DOCUMENTS 5-205284 8/1993 Japan .

*Primary Examiner*—Georgia Y. Epps
*Assistant Examiner*—Kim-Kwok Chu
*Attorney, Agent, or Firm*—Oblon, Spivak, McClelland, Maier & Neustadt, P.C.

[57] ABSTRACT

In an optical head device on which a movable member on which a movable member which can be largely moved to the tracking direction and slightly rotatably moved, if an optical unit is mounted on the movable member in addition to an objective lens, no rotation shaft passing through an interior of the movable member is provided and the central portion of the rotation of the interior of the movable member is made hollow not to interrupt the course of the light beam. Moreover, plate springs for supporting the movable member from the outside are provided such that the movable member can be smoothly rotatably moved to a carriage. The carriage is designed to have smaller mass than that of the movable member. Whereby, the device can be miniaturized and lightened, oscillation can be reduced, and high-speed seek can be obtained.

35 Claims, 8 Drawing Sheets

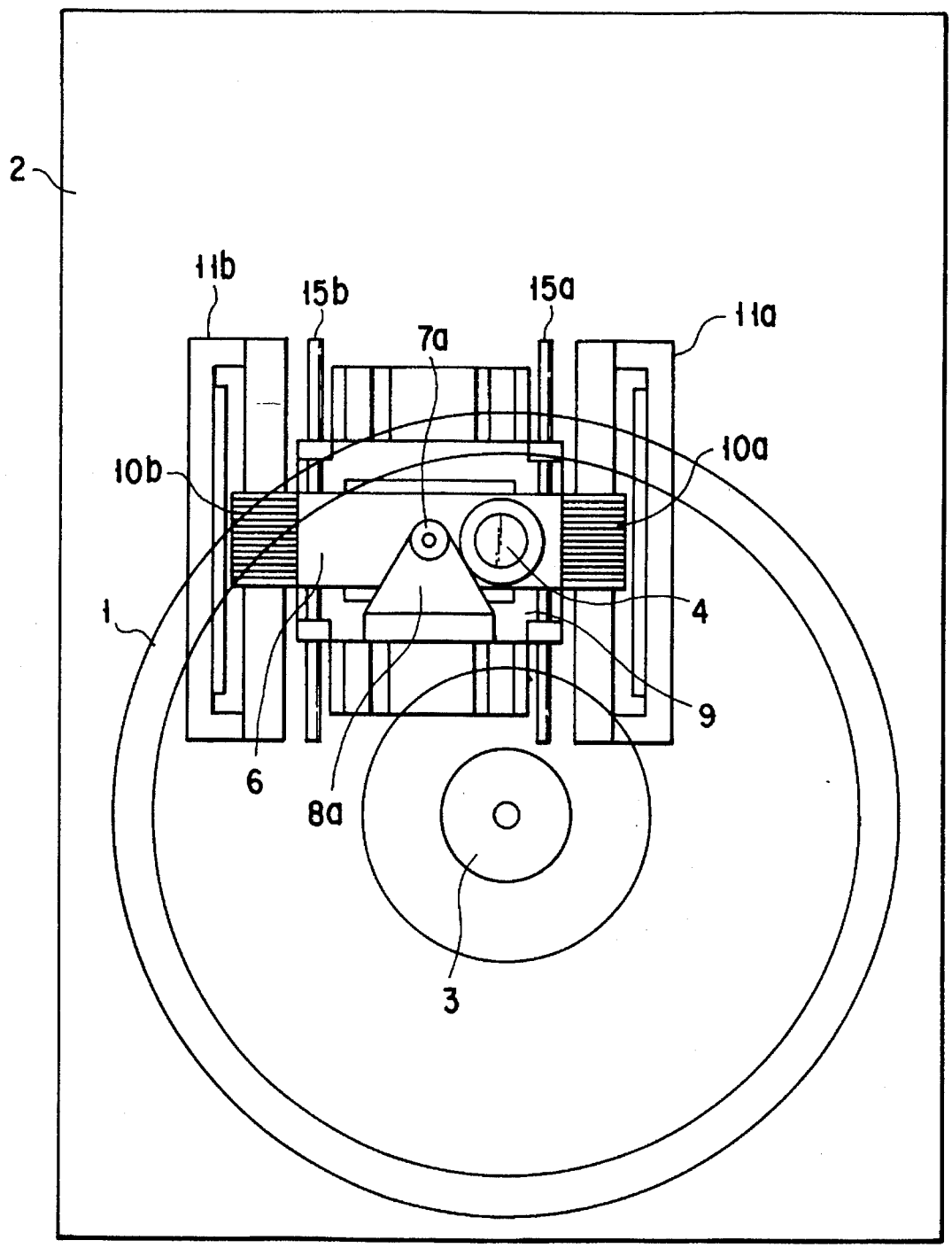
F I G. 3

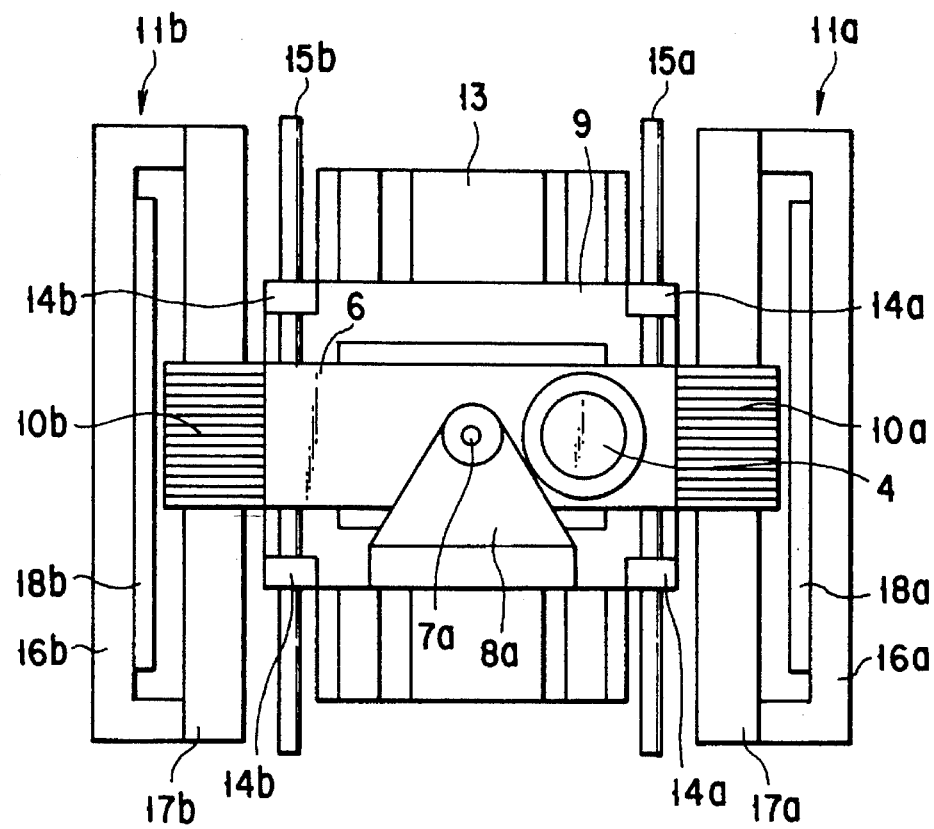
F I G. 4
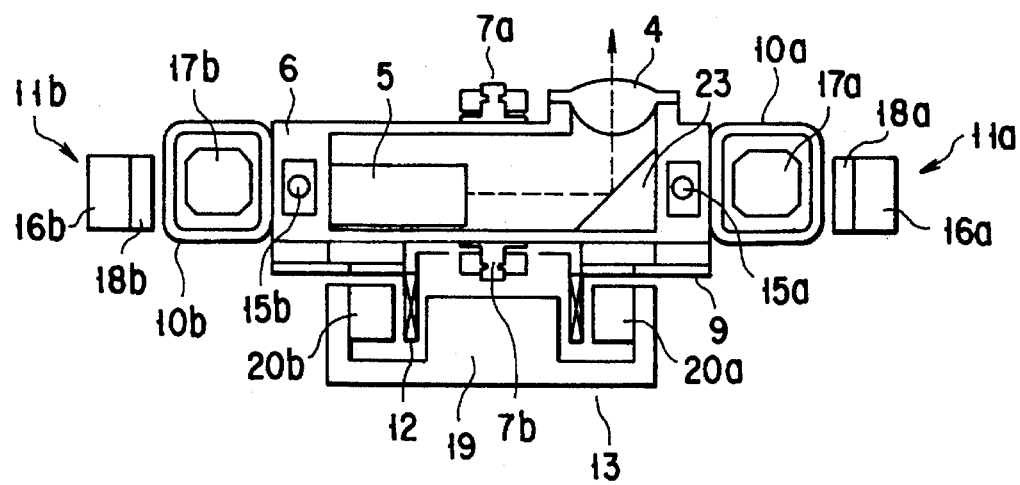
F I G. 5

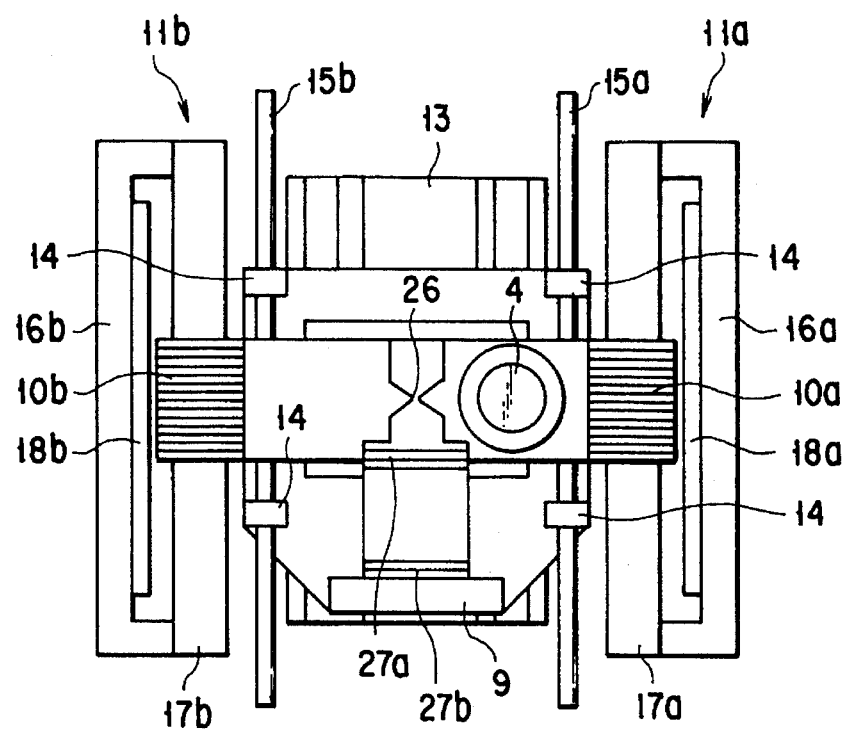
F I G. 12
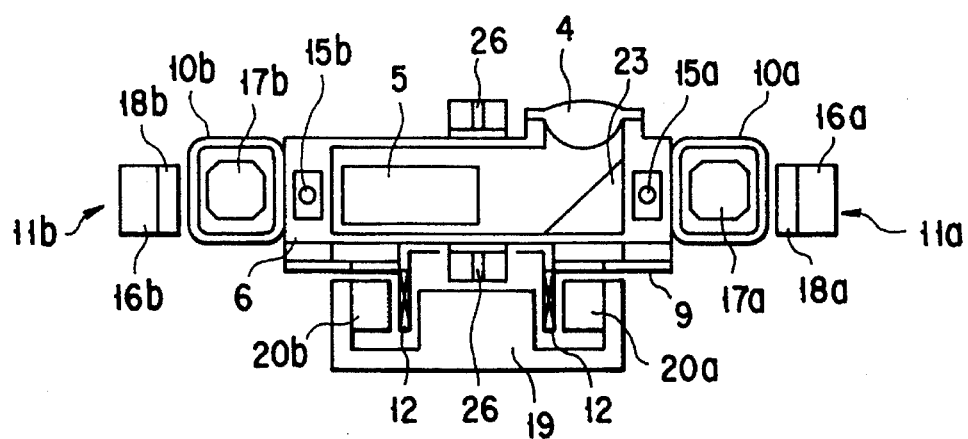
F I G. 13

OPTICAL HEAD DEVICE HAVING ELECTRO-MAGNETICALLY ROTATABLE AND STRAIGHT MOVABLE MEMBERS

BACKGROUND OF THE INVENTION

1. Field of the Invention

The present invention relates to an optical head device used in a reproducing apparatus and a recording apparatus of an optical data recording medium.

2. Description of the Related Art

The development of the optical head device, which is used in the reproducing apparatus and the recording apparatus of the optical data recording medium, has been actively performed in accordance with the development of the optical recording medium such as an optical disk and an optical magnetic disk. The feature of the optical head device lies in high recording density. More specifically, an optical beam is reduced to an optical spot having a size of about 1μ to be applied to the recording medium. Then, data is recorded in the recording medium or data, which is already read, is read. Whereby, the above feature can be realized.

An optical data recording system which can realize such a high recording density is characterized in that the distance between tracks of the recording medium in which data is recorded is narrower than a magnetic recording system. Due to this, there is needed a controlling method for irradiating the narrow recording track with the optical beam. Generally, in order to realize such control, there is required performance for maintaining a natural frequency band to 10 kH to 40 kH in the optical head device. In order to realize such performance, various contrivances have been made to improve an oscillation characteristic of a driving system.

The following will explain the prior art of the optical head device.

FIGS. 1 and 2 are a plain view and a cross sectional view showing the optical head device of the prior art.

In the figures, reference numeral 100 is an objective lens, which is attached to a cylindrical movable member 101. The movable member 101 is provided so as to be rotatable around a shaft 102 extending in a perpendicular direction of an optical disk (not shown) and movable in a longitudinal direction of the shaft 102 in parallel. One end of the shaft 102 is secured to a carriage 103. A slide bearing is provided at two portions of the carriage 103. Since guide rails 105a and 105b are inserted to the slide bearing 104, the carriage 103 can be straight moved. The carriage 103 is supported to be movable from the innermost periphery of the optical recording medium (optical disk) (not shown) to the outermost periphery.

A focusing coil 107 and a tracking coil 108 are adhered to a side surface of the movable member 101. The focusing coil 107 and the tracking coil 108 are formed such that a magnetic filed is provided thereto by a magnetic circuit 109 provided on the carriage 103. Then, a current is made to flow to the focusing coil 107, so that the movable member 101 is moved in a focusing direction, i.e., an optical direction of the objective lens 100. Also, a current is made to flow to the tracking coil 108, so that the movable member 101 is moved to be rotatable around the shaft 102 and the objective lens 100 is slightly moved in the tracking direction.

Moreover, linear motor coil 110a and 110b are attached to both side surfaces of the carriage 103. Linear motor magnetic circuits 111a and 111b are provided on a base (not shown) to provide a magnetic filed to the linear motor coils 110a and 110b. A current is made to flow to the linear motor coils 110a and 110b, so that the carriage 103 is largely moved, and the entire moving body including the objective lens 100 mounted on the carriage 103 can be moved to a place in the vicinity of a desired position of the optical disk.

However, in such a conventional optical head device, there was a problem as motioned below.

More specifically, since the magnetic circuit 109 including a permanent magnet, etc. was mounted on the carriage 103, mass of the entire moving body including the carriage 103 became relatively large. Due to this, acceleration of the carriage 103, which can be obtained by the linear motor coils 110a and 110b, was not always sufficient to realize a future high-speed seek.

In order to solve the above problem, several proposals have been made to reduce the number of parts of the moving body including the carriage. For example, Japanese Patent Application KOKAI Publication No. 5-205284 discloses an optical head device in which no magnetic circuit including the permanent magnet etc. is provided. In this case, the linear motor magnetic circuit, which is conventionally used as a large movement to the tracking direction, is also used as a slight movement. In other words, the large movement and the slight movement to the tracking direction can be realized by combining the linear motor magnetic circuit and the linear motor coils with each other. By this improvement, the reduction of mass of the entire moving body was able to be realized to some extent.

However, the reduction of mass, which is sufficient to obtain the high-speed seek, has not been realized yet. Also, oscillation in which unfavorable influence is exerted on the seek is generated in the movable member due to friction occurred at the time of movement. Moreover, in a case where a driving coil in the focusing direction is provided at both ends of the carriage, the coil is deformed at the time of movement. Due to this, oscillation is generated. As mentioned above, there is still left a problem to be solved.

SUMMARY OF THE INVENTION

Accordingly, it is an object of the present invention to provide an optical head device in which a movable member can be miniaturized and lightened, oscillation is not easily generated in the movable member, and a high-speed seek can be realized.

According to a first aspect of the present invention, there is provided an optical head device for use in recording/reproducing data to/from an optical data recording medium, comprising a first movable member having an optical unit for emitting a light beam and an objective lens for perpendicularly sending the light beam emitted from the optical unit to the optical data recording medium, an interior of the first movable member formed to be hollow to ensure a course of the light beam; a second movable member being capable of moving straight along rods provided in a direction perpendicular to an optical axis of the objective lens; a support member supporting the first and second movable members on a central axis parallel to the optical axis of the objective lens such that the first movable member can be rotated at the central axis; and tracking drive means for generating Lorentz force at least at two points on the first movable member in the respective predetermined directions to obtain the rotational movement of the first movable member or the straight movement of the first and second movable members.

According to the above-mentioned structure, there is no need of a rational shaft passing through the interior of the first movable member. At the same time, the optical unit can be mounted on the first movable member. As a result, the movable member can be miniaturized and lightened, and the high-speed seek can be realized.

According to a second aspect of the present invention, there is provided an optical head device for use in recording/ reproducing data to/from an optical data recording medium, comprising a first movable member having an objective lens for perpendicularly sending a light beam to the optical data recording medium; a second movable member being capable of moving straight along rods provided in a direction perpendicular to an optical axis of the objective lens; a support member supporting the first and second movable members on a central axis parallel to the optical axis of the objective lens such that the first movable member can be rotated at the central axis; and tracking drive means for generating Lorentz force at least at two points on the first movable member in the respective predetermined directions to obtain the rotational movement of the first movable member or the straight movement of the first and second movable members, the second movable member has mass smaller than that of the first movable member such that an oscillation generated in the second movable member is suppressed to transmit to the first movable member at the time of the straight movement.

According to the above-mentioned structure, oscillation is not easily generated in the first movable member. As a result, the high-speed seek can be realized.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 3 is a plane view showing an outline of an optical head device of a first embodiment of the present invention;

FIG. 4 is a plane view showing the optical head device of the first embodiment of the present invention;

FIG. 5 is a cross sectional view showing the optical head device of the first embodiment of the present invention;

FIG. 12 is a plane view showing the optical head device of a fifth embodiment of the present invention;

FIG. 13 is a cross sectional view showing the optical head device of the fifth embodiment of the present invention;

DETAILED DESCRIPTION OF THE PREFERRED EMBODIMENTS

Figure 1:
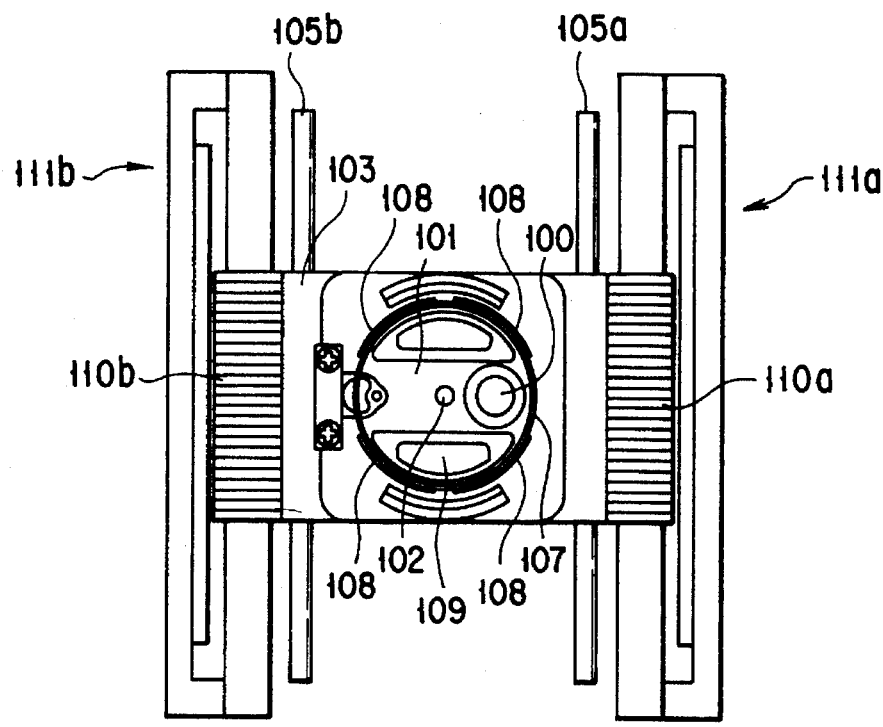
FIG. 1 is a plane view showing a movable section of an optical head device of the prior art.

Embodiments of the present invention will be explained with reference to the drawings.

A first embodiment of an optical head device of the present invention will be explained with reference to FIGS. 3 to 5.

As shown in FIG. 3, a disk 1 such as an optical disk, an optical magnetic disk provided to record/reproduce data is held onto a spindle motor 3, which is fixed to a base 2, by a chucking mechanism such as a magnetic chuck, and stably driven to be rotatable by the spindle motor 3 at the time of recording/reproducing. Then, an optical head device, which irradiates the optical disk 1 with a laser beam, is fixed to the base 2.

FIG. 4 shows a plane view of the optical head device, and FIG. 5 shows a cross sectional view of the optical head device.

The following will explain the optical head device of the first embodiment with reference to FIGS. 4 and 5.

An optical unit 5 (in FIG. 5) including a semiconductor laser for generating a laser beam for radiation to the disk 1 is contained in a movable member 6 to be fixed thereto. The laser beam emitted from the optical unit 5 is guided to an objective lens 4 attached to an upper portion of the movable member 6 through a rise mirror 23. The laser beam is converged on the recording track of the disk 1 from the objective lens 4. A reflection light sent from the disk 1 is returned to the optical unit 5 through the objective lens 4. In the optical unit 5, a photo detector (not shown) is provided. The photo detector receives the reflection light, and generates a data signal, a focus offset signal, and a track offset signal. Moreover, a positional shift of the objective lens 4 in the focus direction is calculated from the focus offset signal, and the track offset signal. In order to correct the positional shift, a control section (not shown) operates such that a current flows into a focusing flat coil 12 (to be described later). On the other hand, a positional shift of the objective lens 4 in the track direction is calculated from the track offset signal. In order to correct the positional shift, the control section (not shown) operates such that a current flows into tracking coils 10a and 10b (to be described later). In this way, data recording onto the track of the disk 1, and data reading from the track are performed.

Figure 14:
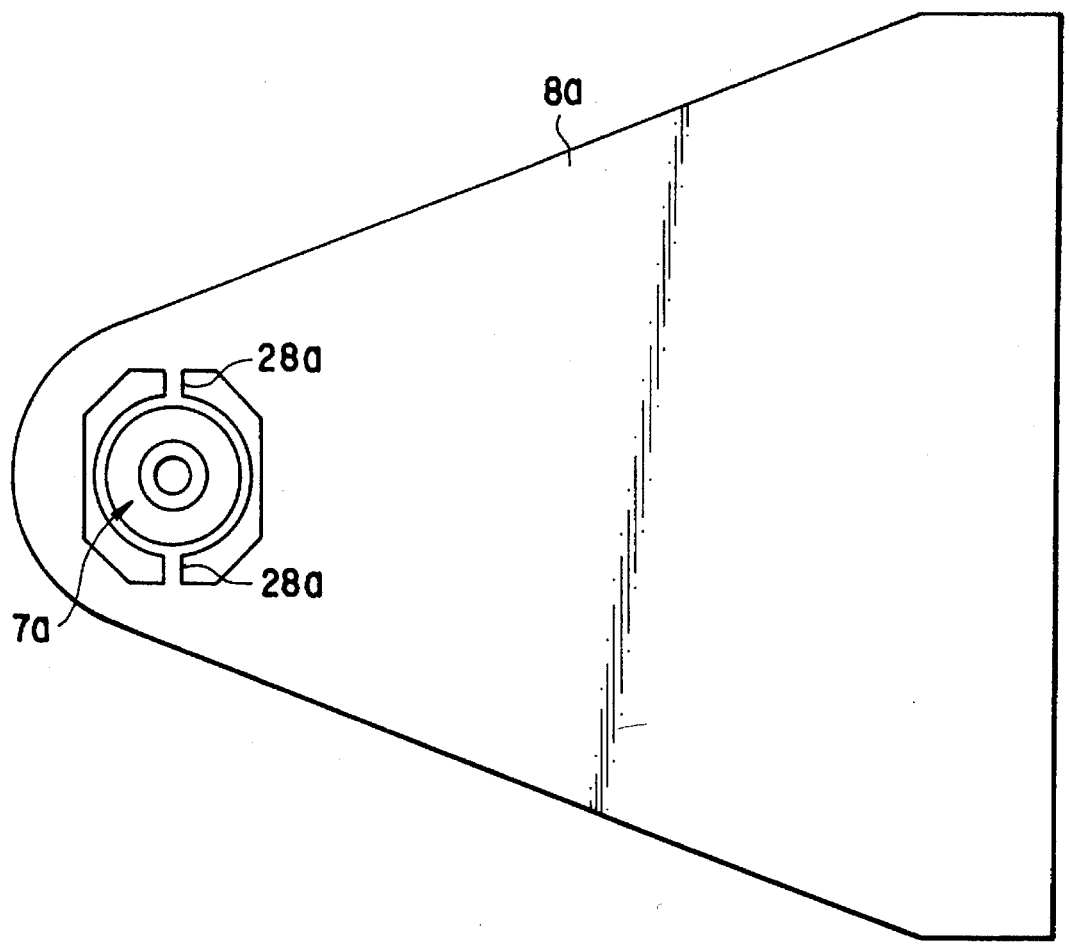
FIG. 14 is a plane view of a plate spring used in the first, second and fourth embodiments.

Two rotation bearings 7a and 7b are attached to upper and lower ends of the movable member 6 to pass through the center of gravity of the movable member 6. The object lens 4 is bonded to the upper portion of the movable member 6, and the position shifted from the center of gravity (position adjacent to the rotation bearing 7a). As shown in FIG. 14, a gimbal section 28a is formed on the portion where the rotation bearing 7a of a plate spring 8a is provided. Similarly, a gimbal section 28b is formed on the portion where the rotation bearing 7b of a plate spring 8b is provided (not shown). As is obvious from FIG. 5, the objective lens 4, the rise mirror 23, and the optical unit 5 are fixed to a position where these elements are balanced in view of mass. In other words, these elements are arranged such that the center of gravity of the moving member 6 are placed on a straight line connecting two rotation bearings 7a and 7b. The interior of the movable member 6 is formed to be hollow not to interrupt the course of the laser beam emitted from the optical unit 5. In this case, since both upper and lower ends of the movable member 6 are supported by two rotation bearings 7a and 7b, it is not needed that an element corresponding to the rotation shaft is provided in the interior of the movable member 6.

The rotation bearings 7a and 7b are inserted into the plate springs 8a and 8b fixed onto a carriage 9, respectively, so that the movable member 6 is rotatably supported. The plate springs 8a and 8b are arranged to be parallel with each other, and sandwich the movable member 6 therebetween from the upper and lower sides. The technique using the property of the plate springs 8a and 8b will be explained in a fourth embodiment later.

Figure 15:
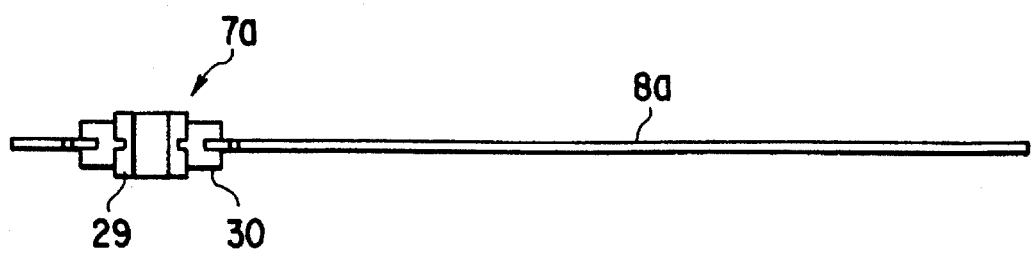
FIG. 15 is a cross sectional view used in the first, second, fourth embodiments.

As shown in FIG. 15, the rotation bearings 7a and 7b comprises a metallic bush 29 fixed to the movable member 6 and a resin ring 30 engaging with the bush 29. The rotation bearing 7a is molded by engaging resin ring 30 with the bush 29 to be formed as one unit. Then, a slidable rotation shaft bearing mechanism is formed by clearance generated by the difference between heat shrinkage of resin and that of metal after molding. The bush 29 and a projection formed on the movable member 6 are fixed to each other by bonding or calking. The resin ring 30 is formed of resin in which carbon fiber is mixed with epoxy resin, and a heat shrinkage rate is controlled by the contents of the carbon fiber and effective conditions.

In order to control the oscillation generated in the movable member 6 on which the objective lens is mounted to the minimum, mass of the carriage 9 is favorably designed to be smaller than that of the movable member 6. As larger the ratio of mass of the carriage 9 to that of the movable member becomes, the smaller oscillation generated in the movable member 6 becomes. This is based on the property in which the object having large mass is not easily oscillated as compared with the object having small mass when two objects contact each other. According to the prior art, a carriage has larger mass relatively. In this case, the removable member 6 is easily oscillated and its amplitude and phase seriously vary. In the first embodiment, the carriage 9 is shaped like a flat plate as shown in FIG. 5 in order to lighten the weight of the carriage 9. Such a flat-plate carriage is used in the second and fifth embodiments to be explained later.

On the other hand, the first and second tracking coils 10a and 10b are provided at the point symmetrical position where the center of gravity of the movable member 6 is positioned as a center. Magnetic flux is provided to the first and second tracking coils 10a and 10b from the tracking magnetic circuit 11a and 11b.

The tracking magnetic circuit 11a and 11b comprise back yokes 16a and 16b, center yokes 17a and 17b, and permanent magnets 18a and 18b. The first and second tracking coils 10a and 10b are provided to be movable in a magnetic gap between the center yokes 17a, 17b and the permanent magnets 18a, 18b. The directions of magnetism of the permanent magnets 18a and 18b conform to the direction of a thickness of the magnetic gap.

As shown in FIG. 5, the focusing flat coil 12 is attached to the bottom portion of the movable member 6. The focusing flat coil 12 is formed by bending the coil, which is rectangularly wound on a plane, to be L-shaped. The magnetic field is provided to the focusing flat coil 12 by a focusing magnetic circuit 13 fixed to the base 2.

The focusing magnetic circuit 13 comprises a yoke 19, and two permanent magnets 20. The focusing flat coil 12 is inserted into the magnetic gap defined by a central convex portion of the yoke 19 and two permanent magnets 20. A magnetic gap of the focusing magnetic circuit 13 is set to be directed to a radial direction of the disk 1. The directions of magnetism of the permanent magnets 20a and 20b conform to the direction of a thickness of the magnetic gap.

If the distance between the bending portions of the focusing flat coil 12 (portions inserted into the magnetic gap) is L1 and the distance, which connects the first tracking coil 10a to the second tracking coil 10b, is L2, it is designed that L1 is smaller than $(4/5) \times 12$ and L2 is larger than $(1/5) \times L2$ in the first embodiment.

Slidable bearings 14a and 14b are provided at right and left portions of the carriage 9, respectively. Two guide rails 15a and 15b are arranged in parallel to be inserted to the slidable bearings 14a and 14b. A space in which the movable member 6 is sufficiently moved in the focusing direction is ensured between the sliding bearings 14a, 14b and the guide rails 15a, 15b. Both ends of the guide rails 15a and 15b are fixed to the base 2. The carriage 9 is supported to be movable along the guide rails 15a and 15b. The width of the magnetic gap of each of the tracking magnetic circuit 11a and 11b is set such that the carriage 9 can be moved in a longitudinal direction of the guide rails 15a and 15b as required, that is, the objective lens 4 can be moved in the tracking direction from the innermost periphery of the disk 1 to the outermost periphery without difficulty. Also, the thickness of the magnetic gap of the tracking magnetic circuits 11a and 11b is designed to some extent that the first and second tracking coils 10a and 10b do not hit against the center yokes 17a and 17b and the permanent magnets 18a and 18b even if the first and second tracking coils 10a and 10b are slightly moved to the direction of the thickness of the magnetic gap. Moreover, the space is ensured to some extent that the first and second tracking coils 10a and 10b do not hit against the center yokes 17a and 17b even if the movable member 6 is moved in the focus direction.

The following will explain an operation of the first embodiment.

If the object lens 4 is moved in the focus direction, a current flows into the focusing flat coil 12 by the control section (not shown). Lorentz force is generated by the current and the magnetic flux of the permanent magnets 20a and 20b, and the movable member 6 and the carriage 9 are moved in the direction of the optical axis of the objective lens 4, that is, focus direction. The control section controls the positioning of the focus direction by increasing or reducing the current following into the focusing flat coil 12.

As mentioned above, the distance L1 between the bending portions of the focusing flat coil 12 is set to $(1/5) L2 \leq L1 \leq (4/5) L2$. Due to this, the point where Lorentz force of the focusing flat coil 12 works is just in the vicinity of a node of an oscillation mode of the movable member 6. Due to this, abnormal resonance is little generated in the movable member 6 when the object lens 4 is driven to the focus direction.

The focusing flat coil 12 is provided at a point symmetrical position where the line connecting the rotation bearings 7a and 7b is positioned as a center, and a position close to the central portion of the rotation of the carriage 9. Due to this, the center of gravity of the focusing flat coil 12 substantially conforms to the center of the rotation of the carriage 9, and a load to be applied may be light at the time when the rotation of the movable member 6 is driven (to be described later).

In a case where the object lens 4 is slightly moved in the track direction, the movable member 6 is slightly rotated to be moved in a state that the rotation bearings 7a and 7b are positioned as a center. Due to this, there is used interaction between Lorentz force generated by the combination of the first tracking coil 10a and the permanent magnet 18a and Lorentz force generated by the combination of the second tracking coil 10b and the permanent magnet 18b. In other words, the current flowing into the tracking coils 10a and 10b is controlled such that the directions of two Lorentz force are opposite to each other. At this time, driving force, which is directed to be opposite to each other, is generated in the first and second tracking coils 10a and 10b. Whereby, the movable member 6 is rotated to be moved in a state that the rotation bearings 7a and 7b are positioned as a center, and the objective lens is slightly moved in the tracking direction.

The slight movement of the objective lens 4 in the tracking direction can be realized by the rotational movement of the movable member 6. Due to this, influence of friction exerting on the rotation bearings 7a and 7b is small, smooth movement can be ensured, and a good controlling operation can be realized. Also, it is not needed that a dedicated magnetic circuit is provided to slightly move the objective lens 4 in the tracking direction.

On the other hand, in a case where the objective lens 4 is largely moved in the tracking direction, similar to the case of the slight rotational movement, there is used interaction between Lorentz force generated by the combination of the first tracking coil 10a and the permanent magnet 18a and Lorentz force generated by the combination of the second tracking coil 10b and the permanent magnet 18b. Then, two Lorentz force are controlled to work in the same direction. Whereby, driving force whose direction is the same is generated in the first and second tracking coils 10a, and 10b. Therefore, the movable member 6 is moved in parallel along the guide rails 15a and 15b together with the carriage 9 without being rotated.

The following will explain a current control operation of the control section in a case where the operation mode is a tracking operation mode.

In order to detect the amount of the shift between The laser beam radiated to the disk 1 and the recording track by the well-known method, and position the movable member 6 to correct the amount of the shift, it is needed that the following two operations (1) and (2) be simultaneously performed.

(1) A current ITA and a current ITB are rendered to flow into the first and second tracking coils 10a and 10b, respectively, so that the movable member 6 is slightly rotated to be moved.

(2) A current ILA and a current ILB are rendered to flow into the first and second tracking coils 10a and 10b, respectively, so that the movable member 6 is moved in parallel.

In other words, the current (ITA+ILA) is rendered to flow into the first tracking coil 10a, and the current (ITB+ILB) is rendered to flow into the second tracking coil 10b.

The control band of the control system due to the currents ITA and ITB for slightly rotatably moving the member 6 to be moved is set to be higher than that of the control system due to the currents ILA and ILB for moving the movable member 6 in parallel. In other words, the movement of the objective lens 4 in the high frequency area is realized mainly by the slight rotational movement of the movable member 6, and the movement of the objective lens 4 in the low frequency area is realized mainly by the parallel movement of the movable member 6. Therefore, the control for suitably switching the slight movement and the parallel movement can be stably maintained in the tracking operation mode.

Moreover, a detector for a displacement of rotation (not shown) is preferably used at the time of the slightly rotational movement so as to control its detected value to be lower as possible. Such a detector is provided in the carriage 9 to monitor the displacement of rotation, thereby making it possible to prevent the tracking coils 10a and 10b and the permanent magnets 18a and 18b from colliding with each other by largely increase in the rotation angle of the movable member 6. It is of course that the rotation angle of the movable member 6 may be forcibly maintained to be a predetermined range by a mechanical stopper.

The large movement and the slight movement to the tracking direction can be realized by combining the same magnetic circuits 11a and 11b and the tracking coils 10a and 10b. The magnetic circuits 11a and 11b including the permanent magnets 18a and 18b having large mass are structured not to be mounted on the moving section such as the movable member 6 and the carriage 9. Due to this, mass of the moving portion is largely reduced, so that the high-speed movement of the movable portion and the high-speed positioning can be realized.

As mentioned above, in order to selectively control current to flow into the tracking coils 10a and 10b, there may performed the control for flowing the current so as to correct the positional shift of a target object in the tracking direction of the objective lens 4 by use of the track offset signal obtained through photo detecting means provided in the optical unit 5.

Moreover, the slight movement to the tracking direction can be realized by not the parallel movement but the rotational movement. Generally, in the case where the object is rotatably moved, mass of the central position of the rotation little works as a load at the time of movement. In the case where the object is moved in parallel, mass of all positions works as a load preventing the movement. Therefore, as compared with the structure in which both large movement and the slight movement can be realized by the parallel movement, the structure using the rotational movement can largely increase acceleration of the slight movement at the position of the objective lens.

As mentioned above, according to the first embodiment, the interior of the movable member 6 is formed to be hollow not to interrupt the course of the laser beam. Also, an element corresponding to the rotation shaft is not provided in the interior of the movable member 6. Therefore, the movable member 6 can be miniaturized and lightened. Moreover, the objective lens 4, the rise mirror 23, and the optical unit 5, which are provided in the movable member 6, are arranged such that the center of gravity is positioned at the central portion of the rotation of the movable member 6. Therefore, the load, which is generated when the movable member 6 is rotated, can be reduced. Whereby, high-speed seek can be realized.

Moreover, the rotation supporting section is structured such that the plate springs 8a and 8b are arranged to be parallel with each other, and sandwich the movable member 6 therebetween from the upper and lower sides. The rotation bearings 7a and 7b, which are inserted into the plate springs 8a and 8b, respectively, supports the movable member 6 to be freely rotatable. By the simple structure of the rotation supporting section, the manufacturing cost of the parts can be reduced, and friction generated at the time of the rotation can be controlled.

Moreover, the movement to the focusing direction can be realized by the combination of the focusing flat coil 12 and the focusing magnetic circuit 1. Whereby, oscillation, which is conventionally generated in the movable member 6, can be prevented. Also, the point where Lorentz force of the focusing flat coil 12 is the position of the node of the oscillation mode of the movable member 6. Due to this, abnormal resonance is little generated in the movable member 6.

Figure 6:
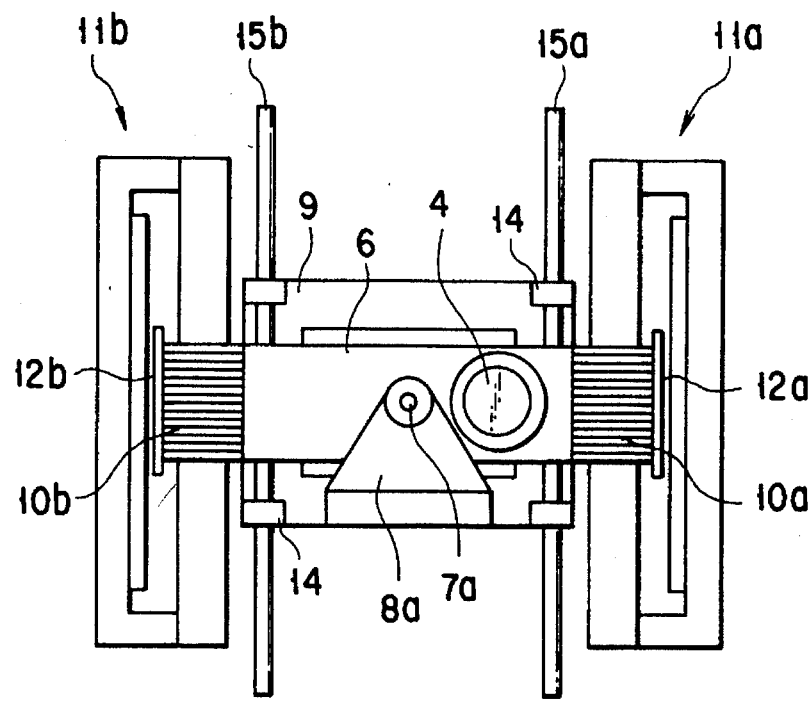
FIG. 6 is a plane view showing the optical head device of a second embodiment of the present invention.
Figure 7:
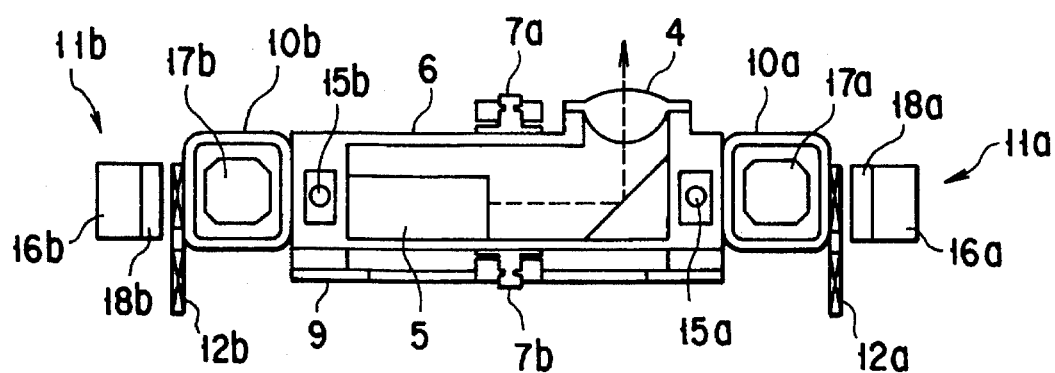
FIG. 7 is a cross sectional view showing the optical head device of the second embodiment of the present invention.

The following will explain a second embodiment of the optical head device of the present invention with reference to FIGS. 6 and 7. In the explanation of each of the following embodiments, the same reference numerals are added to the same parts as the first embodiment, and the same explanation will be omitted.

The difference between the first and second embodiments lies in the arrangement of the focusing flat coil and the magnetic circuit. More specifically, in the first embodiment, the tracking magnetic circuits 11a and 11b, and the focusing magnetic circuit 13 were separately provided. In the second embodiment, each of the focusing flat coils 12a and 12b, which are rectangularly wound on the plane, is adhered to the outside of each of the tracking coils 10a and 10b, that is, the position close to the permanent magnets 18a and 18b. Then, both the parallel and rotational movements to the focus direction including and the parallel and rotational movements to the tracking direction can be performed by the tracking magnetic circuits 11a and 11b used in the first embodiment.

The following will explain the operation of the movement to the focus direction.

As explained in the first embodiment, the movement of the objective lens to the focus direction was realized by rendering the current to flow into the single focus flat coil 12. In the second embodiment, the current is rendered to flow into each of two focusing flat coils 12a and 12b. In this case, the current is controlled such that Lorentz force generated by the combination of the focusing flat coil 12a and the tracking magnetic circuit 11a, and Lorentz force generated by the combination of the focusing flat coil 12b and the tracking magnetic circuit 11b always work in the same direction. Whereby, the movable member 6 can be moved in parallel to the focus direction.

As mentioned above, according to the second embodiment, the following large effects can be expected from the practical point of view:

Specifically, the entire movable section of the device can be formed to thin and flat, and the miniaturization of the device can be realized. Moreover, the absolute amount of the permanent magnet to be used in the entire device can be reduced.

The arrangement of the focusing flat coils 12a and 12b is conventionally used. In the second embodiment, the structure for miniaturizing and lightening the device, and reducing the oscillation as explained in the first embodiment is provided. For example, the interior of the movable member 6 is formed to be hollow, and mass of the carriage 9 can be reduced.

Figure 8:
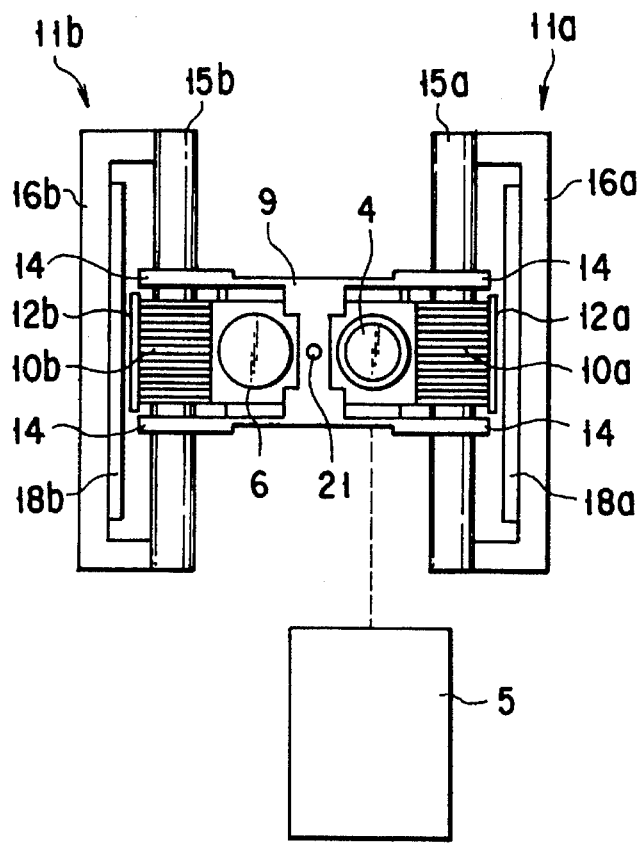
FIG. 8 is a plane view showing the optical head device of a third embodiment of the present invention.
Figure 9:
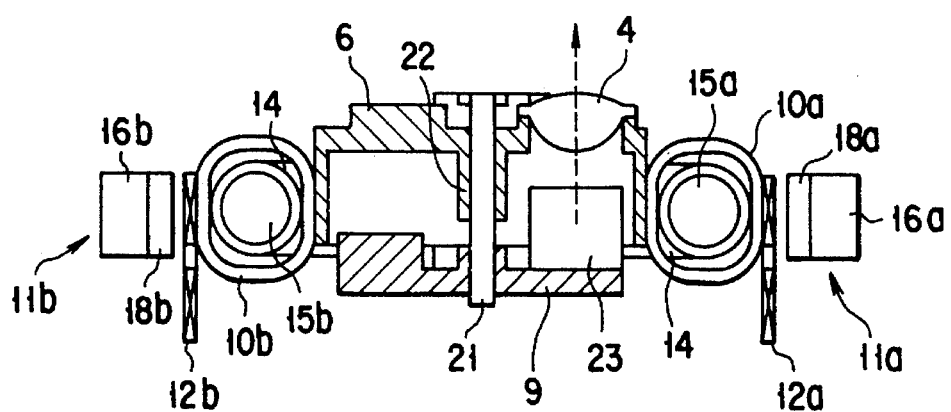
FIG. 9 is a cross sectional view showing the optical head device of the third embodiment of the present invention.

The following will explain a third embodiment of the optical head device of the present invention with reference to FIGS. 8 and 9.

Figure 2:
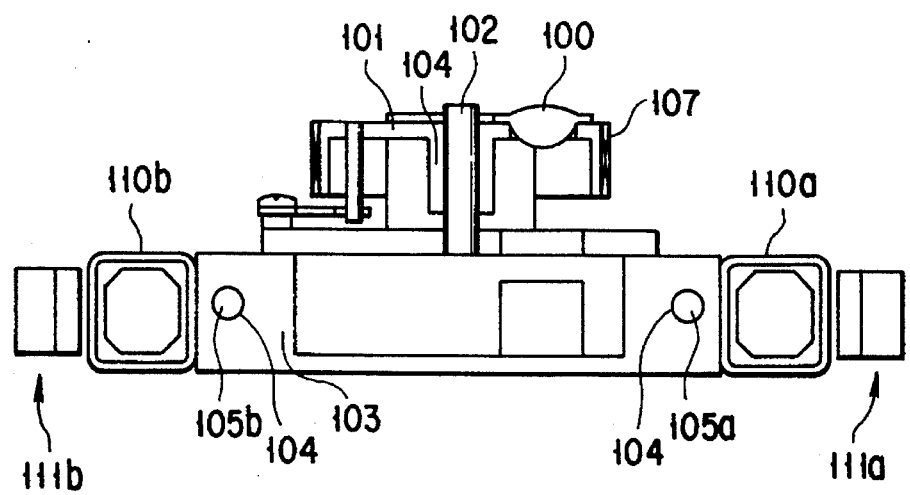
FIG. 2 is a cross sectional view showing the movable section of the optical head device of the prior art.

The third embodiment differs from the second embodiment in the following three points:

(1) The optical unit 5 is not contained in the space of the interior of the movable member 6. The optical unit 5 is attached to the base 2 (FIG. 2).

(2) The guide rails 15a and 15b are used as center yokes for the tracking magnetic circuits 11a and 11b.

(3) A shaft 21 is passed through the movable member 6, so that an axially sliding support can be realized.

More specifically, the improvement of the optical unit will be explained as follows.

Radiation of the laser beam emitted from the optical unit 5 fixed to the base 2 is provided to the tracking direction of the movable member 6. The laser beam is inputted to the interior of the movable member 6 from a hole of the movable member 6, and bent at a right angle to the tracking direction of the movable member 6 by the rise mirror 23 to be guided to the objective lens 4 attached to the upper portion of the movable member 6. Then, the laser beam is converged on the recording track of the disk 1 by the objective lens 4. The reflection light sent from the disk 1 is passed through the objective lens 4 and the rise mirror 23, separated from the movable member 6, and returned to the optical unit 5. The signal processing of the laser beam guided to the optical unit 5 is the same as the case of the first embodiment.

Since the optical unit 5 is removed from the movable member 6, there is fear that the weight of the tracking coil 10a where the objective lens 4 and the rise mirror 23 are fixed may be increased as shown in FIG. 9. Due to this, in the third embodiment, the movable member and a part of the tracking coil 10b of the carriage 9 are made thicker such that the center of gravity is positioned on the shaft 21.

The improvement of the guide rails will be explained as follows.

The slide bearing 14, which is elastically supported, is provided at each of four corners of the carriage 9, and two slide bearings 14 are provided to each of the guide rails 15a and 15b. the guide rails 15a and 15b are extended in the radial direction of the disk 1 such that the carriage 9 is movable to the tracking direction. The guide rails 15a and 15b are formed of material having a high magnetic permeability such as metal. In this way, the magnetic circuits 11a and 11b are structured by combining the guide rails 15a and 15b, permanent magnets 18a and 18b, and the back yokes 16a and 16b.

Similar to the case of the second embodiment, the focusing flat coil 12 is adhered to the outside of each of the tracking coils 10a and 10b at the point symmetrical position where the center of gravity of the movable member 6 is positioned as a center. Then, the magnetic circuits 11a and 11b apply a predetermined magnetic field to the tracking coils 10a and 10b, and the focusing flat coils 12a and 12b so as to generate driving force of the carriage 9.

The improvement of the supporting system of the movable member will be explained as follows.

The objective lens 4 is fixed to the movable member 6 with photo-setting adhesive. In the movable member 6, the shaft 21, which is uprightly buried in the carriage 9, is inserted into the hole of a bearing section 22 provided in the vicinity of the center of gravity.

By use of the above structure, that is, the axially sliding system, the movable member is supported such that the movement to the axial direction of the shaft 21, that is, the direction of the optical axis of the objective lens 4 (focusing direction), and the movement to the axially rotating direction (tracking direction) can be performed. The operation for controlling the movement to the focus direction by the control section and the operation for controlling the movement to the tracking direction are the same as the case of the second embodiment.

As mentioned above, according to the third embodiment, the optical unit 5 is provided at the outer section of the movable member 6, so that there is no need that the optical path is provided in the movable member 6. Therefore, the space for uprightly providing the shaft 21 can be ensured at the movable member 6 and the central portion of the carriage 9, and the supporting mechanism for moving the movable member 6 in two directions can be replaced with the easy system, that is, the axially sliding system. Moreover, since the guide rails 15a and 15b, and the magnetic circuit are formed as one unit, the number of the parts of the device can be reduced, and the weight of the device can be lightened.

Figure 10:
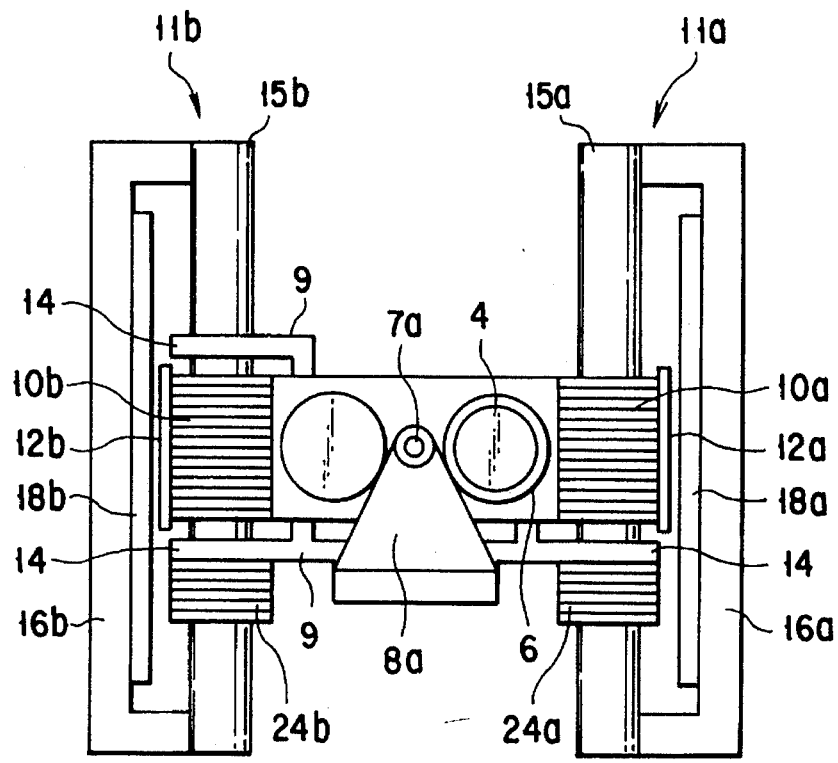
FIG. 10 is a plane view showing the optical head device of a fourth embodiment of the present invention.
Figure 11:
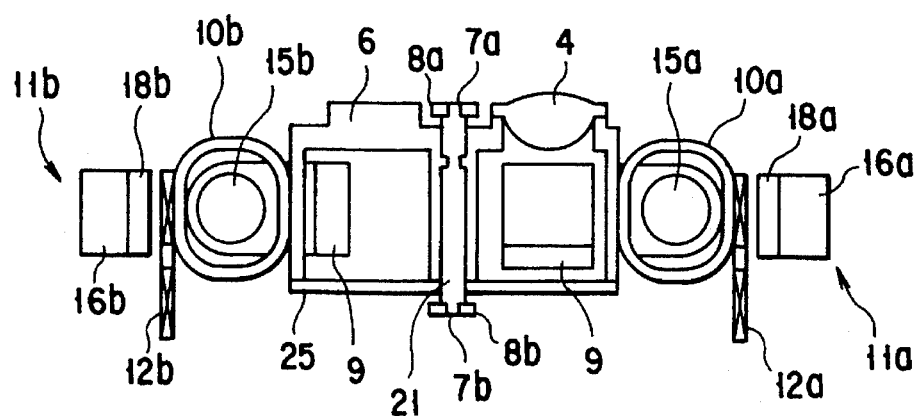
FIG. 11 is a cross sectional view showing the optical head device of the fourth embodiment of the present invention.

The following will explain a fourth embodiment of the optical head device of the present invention with reference to FIGS. 10 and 11.

The fourth embodiment differs from the third embodiment in the following two points:

(1) The support of the movable member 6 is performed by not the axially sliding system but the plate spring, so the movement to the focus direction and the movement to the tracking direction due to the axial rotation can be realized.

(2) Two boost coils 24a and 24b are provided in the carriage 9.

More specifically, the improvement of the moving system will be explained as follows:

The improvement of the moving system will be explained as follows:

The shaft 21 is uprightly inserted into the movable member 6 to be passed through the center of gravity. Both ends of the shaft 21 are supported by the bearings 7a and 7b, and the movable member 6 is freely rotatable. The plate springs 8a and 8b have the same structure as the plate springs of FIGS. 14 and 15 explained in the first embodiment. In other words, the rotation bearings 7a and 7b are fixed to the plate springs 8a and 8b, and supported thereby.

The plate spring 8a is fixed to the upper portion of the movable member 6, and the plate spring 8b is fixed to the lower portion of an auxiliary plate 25 (lower portion of the movable member 6). When the movable member 6 is moved to the focus direction, the plate springs 8a and 8b are appropriately deformed by the gimbal section 28a (FIG. 14), so that the support of the movable member 6 is suitably maintained. Therefore, both the rotational movement around the axis of the shaft 21 and the parallel movement in the axial direction can be performed.

The improvement of the boost coil will be explained as follows:

In the carriage 9, the slide bear 14 is provided at one portion of the guide rail 15a and two portions of the guide rail 15b. Two boost coils 24a and 24b are provided to the side surfaces of two bearings 14, respectively. The boost coils 24a and 24b are cylindrically wound around the side surface of the bearing 14, and positioned to be passed through the guide rails 15a and 15b.

The magnetic circuits 11a and 11b are formed of guides rails 15a and 15b, the magnets 18a and 18b, and the back yokes 16a and 16b. The magnetic circuits 11a and 11b provide a predetermined magnetic field to the tracking coils 10a and 10b, the focusing flat coils 12a and 12b, and the boost coils 24a and 24b.

The method for supplying the current to the tracking coils 10a and 10b is the same as the method explained in the first embodiment. Similarly, the slight movement can be realized by the rotational movement of the movable member 6, and the large movement can be realized by the parallel movement of the movable member 6. The boost coils 24a and 24b newly provided are not related to rotational driving force of the movable member 6. These boost coils 24a and 24b are used only to assist the parallel movement of the carriage 9. The controlling band of the boost coils 24a and 24b are set to be the same band as the band of the parallel movement mode of the movable member 6.

As explained above, according to the fourth embodiment, by use of the boost coils 24a and 24b, disturbance effect, which is caused by frictional force of the slide bearing 14, can be reduced, and positioning control having higher precision can be realized. Moreover, since the oscillation property to the tracking direction can be improved, and the band of the parallel movement mode itself can be improved, positioning control having higher precision and speed control having a low velocity error can be realized.

The shape of the carriage 9 of the fourth embodiment is designed to some extent that the three slide bearings 14 and the rise mirror 23 can be supported, and the bottom portion of the movable member 6 is sealed with the auxiliary plate 25. Whereby, the weight of the device can be much lightened.

The following will explain a fifth embodiment of the optical head device of the present invention with reference to FIGS. 12 and 13.

The fifth embodiment differs from the fourth embodiment in the point that a hinge mechanism is used in the movement to the focus direction and the movement to the tracking direction.

More specifically, a hinge portion 27b is formed at the end portion of the carriage 9. A hinge portion 27a is formed at other end of the plate material having the hinge 27a at its one end. Two hinge portions 27a and two hinge portions 27b are provided at the upper and lower portions of the plate material, respectively. In other words, there is obtained a state that two plate materials having the hinge portions 27a and 27b are formed in parallel. Also, there is provided a hinge portion 26 to elastically support the movable member 6 at one end of the hinge portion 26 and rotatably move the movable member 6. The hinge portion 26 is provided at each of the upper and lower of the movable member 6 to sandwich the movable member 6.

As mentioned above, according to the fifth embodiment, similar to each of the above-mentioned embodiments, the movable member 6 can be moved in the parallel direction and the rotational direction. Particularly, since there is no need that the slide bearing for the rotational direction is provided, the manufacture of the device can be easily made.

As mentioned above, according to the present invention, since the interior of the movable member can be formed to be hollow not to interrupt the course of the laser beam, the movable member can be miniaturized and lightened. Whereby, the correct and high-speed seek can be realized.

Moreover, mass of the carriage is designed to be smaller than that of the movable member, so that the oscillation generated in the movable member can be suppressed.

Even in the case where the boost coils are used, positioning control having higher precision and speed control having a low velocity error can be realized since the oscillation property to the tracking direction can be improved.

Moreover, the present invention is structured such that Lorentz force is generated in the lower portion of the movable member (corresponding to the node of the oscillation mode) when the movable member is moved to the focus direction. Whereby, the oscillation generated in the movable member can be further suppressed.

Furthermore, by use of the plate spring or the hinge in the rotational support section, the manufacturing cost of the parts can be reduced, and friction, which is generated at the time of rotation, can be suppressed.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An optical head device for use in recording/reproducing data to/from an optical data recording medium, comprising:
   a first movable member having an optical unit for emitting a light beam and an objective lens for perpendicularly sending the light beam emitted from said optical unit to said optical data recording medium, an interior of said first movable member formed to be hollow to ensure a course of said light beam;
   a second movable member being capable of moving straight along a pair of guide rails provided in a direction perpendicular to an optical axis of said objective lens;
   a support member supporting said first movable member on said second movable member at a central axis of said first movable member parallel to the optical axis of said objective lens such that said first movable member can be rotated about said central axis; and
   tracking drive means for generating electro-magnetic force at least at two points on said first movable member in predetermined directions to obtain a rotational movement of said first movable member or a straight movement of said second movable member.

2. The device according to claim 1, wherein said optical unit and said objective lens are arranged at both sides of said first movable member to sandwich said central axis therebetween.

3. The device according to claim 2, wherein center of gravity of said first movable member exists on said central axis.

4. The device according to claim 2, wherein the light beam emitted from said optical unit is passed through said central axis, reflected on a rise mirror, and sent to said objective lens.

5. The device according to claim 4, wherein the light beam emitted from said optical unit is passed through said central axis straight in a direction perpendicular to said central axis.

6. The device according to claim 1, wherein said second movable member has mass smaller than that of said first movable member such that an oscillation generated in said second movable member is suppressed to transmit to said first movable member at the time of said straight movement.

7. The device according to claim 1, wherein said tracking drive means includes means for generating electro-magnetic force to said second movable member in a straight direction so as to assist the straight movement of said second movable member.

8. The device according to claim 7, wherein said support member has a plate spring to support to sandwich said first and second movable member therebetween from an outside on said central axis.

9. The device according to claim 8, wherein said plate spring has two slide bearings such that said first movable member can be smoothly rotatably moved.

10. The device according to claim 7, wherein said support member has a hinge to support to sandwich said first and second movable member therebetween from the outside on said central axis.

11. The device according to claim 1, wherein said tracking drive means generates two electromagnetic force in the same direction when obtaining the straight movement, and two electromagnetic force in an opposite direction when obtaining rotational movement.

12. The device according to claim 1, wherein said tracking drive means includes:
    coil means provided at points where said electromagnetic force is generated;
    magnet means for applying magnetic flux to said coil means; and
    a control circuit for varying a current flowing into said coil means where said magnetic flux is applied.

13. The device according to claim 12, wherein said pair of guide rails are said magnet means.

14. The device according to claim 12, further comprising:
    focusing drive means for generating electromagnetic force at least at two points on said first movable member in the direction of the optical axis to obtain the movement of said first movable member to the direction of the optical axis.

15. The device according to claim 14, wherein said focusing drive means includes:
    coil means provided at points where said electromagnetic force is generated;
    magnet means for applying magnetic flux to said coil means; and
    a control circuit for varying a current flowing into said coil means where said magnetic flux is applied.

16. The device according to claim 15, wherein the magnet means included in said tracking drive means and the magnet means included in said focusing drive means are unified.

17. The device according to claim 14, wherein said focusing drive means includes:
    coil means provided at points where said electromagnetic force is generated;
    magnet means for applying magnetic flux to said coil means; and
    a control circuit for varying a current flowing into said coil means where said magnetic flux is applied.

18. The device according to claim 1, further comprising:
    focusing drive means for generating electromagnetic force at least at two points, corresponding to nodes of an oscillation mode of said first movable member, in the direction of the optical axis to obtain the movement of said first movable member to the direction of the optical axis.

19. The device according to claim 1, wherein said support member has a plate spring to support to sandwich said first and second movable member therebetween from the outside on said central axis.

20. The device according to claim 19, wherein said plate spring has two slide bearings such that said first movable member can be smoothly rotatably moved.

21. The device according to claim 1, wherein said support member has a hinge to support to sandwich said first and second movable member therebetween from the outside on said central axis.

22. An optical head device for use in recording/reproducing data to/from an optical data recording medium, comprising:
- a first movable member having an objective lens for perpendicularly sending a light beam to said optical data recording medium;
- a second movable member being capable of moving straight along a pair of guide rails provided in a direction perpendicular to an optical axis of said objective lens;
- a support member supporting said first movable member on said second movable member at a central axis of said first movable member parallel to the optical axis of said objective lens such that said first movable member can be rotated about said central axis; and
- tracking drive means for generating electromagnetic force at least at two points on said first movable member in predetermined directions to obtain a rotational movement of said first movable member or a straight movement of said second movable member,
- said second movable member having mass smaller than that of said first movable member such that an oscillation generated in said second movable member is suppressed to be transmitted to said first movable member at the time of said straight movement.

23. The device according to claim 22, further comprising an exterior type optical unit for emitting a light beam to be supplied to said objective lens.

24. The device according to claim 23, wherein said support member has a slide shaft passing through said first movable member on said central axis.

25. The device according to claim 22, wherein said second movable member is shaped into a plate.

26. The device according to claim 25, wherein said support member has a plate spring to support to sandwich said first and second movable member therebetween from an outside on said central axis.

27. The device according to claim 26, wherein said plate spring has two slide bearings such that said first movable member can be smoothly rotatably moved.

28. The device according to claim 25, wherein said support member has a hinge to support to sandwich said first and second movable member therebetween from the outside on said central axis.

29. The device according to claim 22, wherein said tracking drive means includes:
- coil means provided at points where said electromagnetic force is generated;
- magnet means for applying magnetic flux to said coil means; and
- a control circuit for varying a current flowing into said coil means where said magnetic flux is applied.

30. The device according to claim 29, wherein said pair of guide rails are said magnet means.

31. The device according to claim 29, further comprising:
- focusing drive means for generating electromagnetic force at least at two points on said first movable member in the direction of the optical axis to obtain the movement of said first movable member to the direction of the optical axis.

32. The device according to claim 31, wherein said focusing drive means includes:
- coil means provided at points where said electromagnetic force is generated;
- magnet means for applying magnetic flux to said coil means; and
- a control circuit for varying a current flowing into said coil means where said magnetic flux is applied.

33. The device according to claim 32, wherein the magnet means included in said tracking drive means are the magnet means included in said focusing drive means.

34. The device according to claim 22, further comprising:
- focusing drive means for generating electromagnetic force at least at two points, corresponding to nodes of an oscillation mode of said first movable member, in the direction of the optical axis to obtain the movement of said first movable member to the direction of the optical axis.

35. The device according to claim 34, wherein said focusing drive means includes:
- coil means provided at points where said electromagnetic force is generated;
- magnet means for applying magnetic flux to said coil means; and
- a control circuit for varying a current flowing into said coil means where said magnetic flux is applied.

* * * * *